United States Patent [19]

Rodiere et al.

[11] Patent Number: 4,502,009

[45] Date of Patent: Feb. 26, 1985

[54] APPARATUS ADAPTED FOR SINGLE PULSE ELECTROMAGNETIC MEASUREMENTS OF SOIL CONDUCTIVITY AND DIELECTRIC CONSTANT

[75] Inventors: Charles Rodiere, Marly Le Roi; Michel Crochet, Verneuil sur Seine, both of France

[73] Assignee: Societe Nationale Industrielle Aerospatiale, Paris, France

[21] Appl. No.: 340,592

[22] Filed: Jan. 19, 1982

[30] Foreign Application Priority Data

Jan. 20, 1981 [FR] France .................. 81 01019

[51] Int. Cl.³ ............... G01V 3/12; H01Q 1/04
[52] U.S. Cl. .................. 324/337; 343/719; 355/40
[58] Field of Search ............ 324/330, 332, 334–338; 355/40; 343/719

[56] References Cited

U.S. PATENT DOCUMENTS

| | | | |
|---|---|---|---|
| 1,429,240 | 9/1922 | Hanson et al. | 343/719 |
| 1,530,129 | 3/1925 | Loftin et al. | 343/719 |
| 1,638,699 | 8/1927 | Moburg | 343/719 |
| 1,681,644 | 8/1928 | Maple | 343/719 X |
| 2,455,941 | 12/1944 | Muskat . | |
| 2,766,422 | 10/1956 | Carbonetto | 324/337 |
| 3,060,372 | 10/1962 | Cagniard | 324/349 |
| 3,392,384 | 7/1968 | Wesch | 324/337 X |
| 3,690,164 | 9/1972 | Gabillard et al. | 324/338 X |
| 3,775,765 | 11/1973 | Di Piazza et al. | 324/337 X |
| 3,831,173 | 8/1974 | Lerner | 324/337 X |
| 4,052,666 | 10/1977 | Fletcher et al. . | |
| 4,308,499 | 12/1981 | Thierbach et al. | 324/338 X |

FOREIGN PATENT DOCUMENTS

| | | | |
|---|---|---|---|
| 2535259 | 2/1977 | Fed. Rep. of Germany | 324/334 |
| 1200597 | 12/1959 | France | 324/337 |
| 1533337 | 7/1968 | France . | |
| 2283451 | 3/1976 | France . | |
| 1119151 | 7/1968 | United Kingdom . | |

Primary Examiner—Gerard R. Strecker
Attorney, Agent, or Firm—Karl W. Flocks; Sheridan Neimark; A. Fred Starobin

[57] ABSTRACT

A method and installation for ground illumination by means of electromagnetic radiation generated by an aerial simulator coupled to the ground and for calculation of the dielectric constant and conductivity of the ground from said radiation are described. Radiation is transmitted in form of an electromagnetic pulse having predetermined characteristics from an aerial simulator of the horn type, the characteristics of the pulse are sensed at a point in the illuminated area and the dielectric constant and the conductivity of the ground are calculated from the detected values. The apparatus constituting the simulator comprises at least two conductive layers e.g. of conductive wires, united on one side to form the horn, and ending up on the opposite side at the ground where they are extended by a buried structure and on that side where they are united, in a connector to provide connection with pulse generating and measurement means.

16 Claims, 34 Drawing Figures

FIG.13
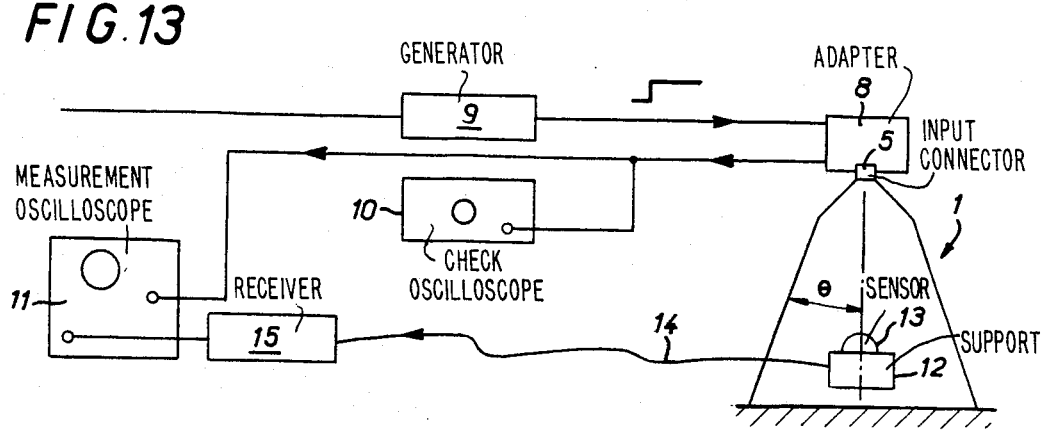
FIG 14A  FIG.14B  FIG.14C
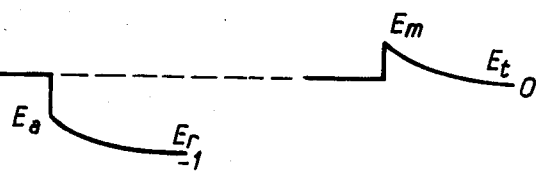
FIG.14D  FIG.14E  FIG.14F
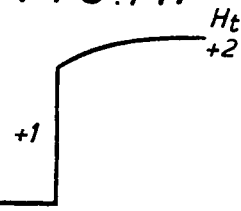
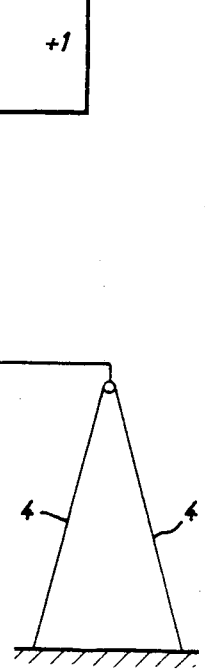
FIG.16

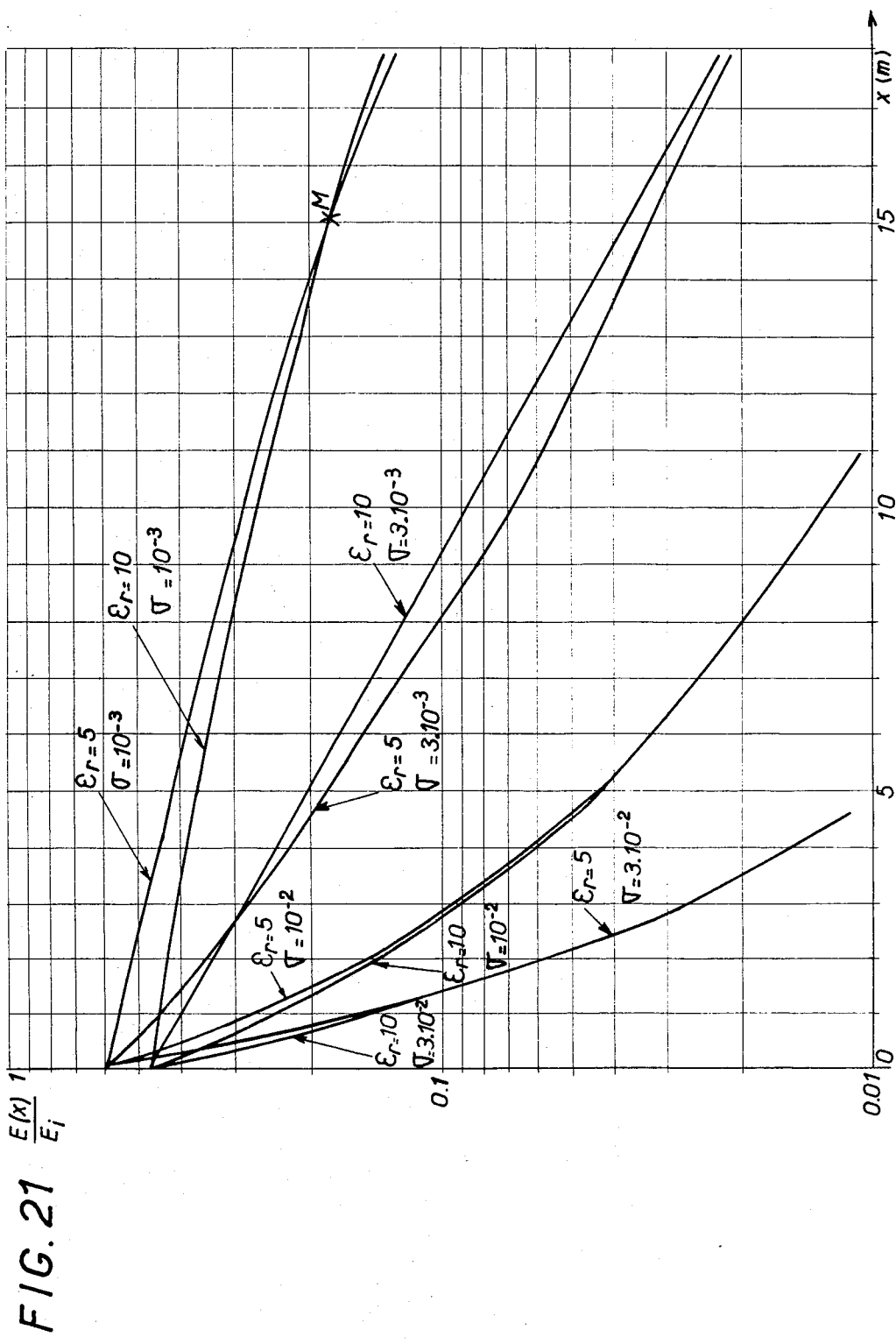

APPARATUS ADAPTED FOR SINGLE PULSE ELECTROMAGNETIC MEASUREMENTS OF SOIL CONDUCTIVITY AND DIELECTRIC CONSTANT

FIELD OF THE INVENTION

The invention relates to a ground illumination method by means of an electromagnetic pulse generated by an aerial simulator coupled to the ground, and for calculation of the dielectric constant and conductivity thereof from such pulse. It also relates to the simulator coupled to the ground for carrying out such method.

BACKGROUND OF THE INVENTION

The conditions for illumination of objects on the surface of the ground or in depth by an electromagnetic field pulse can be employed for instance in the domain of civil protection.

Similarly, the knowledge of values of the conductivity and dielectric permittivity of ground from electromagnetic reflectrometry measurements resulting from an illumination can be pursued in the geological domain which usually requires extensive means such as drillings to different depths.

Furthermore, methods are known to this end, permitting determination of the characteristics, in particular the dielectric constant and/or the electric conductivity of ground formations drilled through by a probing and involving means for transmitting electromagnetic energy from a first probing location, other means being provided to sense a first parameter, preferably, the relative attenuation of the electromagnetic energy at a second location of the probing.

Unfortunately, such means require a drilling, a probe disposed in the drilling, a generator of sinusoidal waves on the probe and at least a remote receiver for measurement of the relative attenuation of the energy of the electromagnetic sinusoidal wave or the phase shifting thereof thereby complicating somehow the measurement operation.

Moreover, since the wave is sinusoidal at a well determined frequency, information obtained relates to the ground conditions only at that frequency so that the possible interpretation of the results is relatively limited.

SUMMARY OF THE INVENTION

The method in accordance with the invention which will be described hereinafter will illustrate how measurements can be obtained, permitting simply to calculate the value $\sigma$ and $\epsilon$ corresponding to the conductivity and permittivity or dielectric constant of the ground, respectively, in the neighbourhood thereof or in the ground itself, with considerable possibilities of investigation.

The simulator and the measurement means thereof for carrying out the method will also be described hereinafter.

Thus, for remedying the above-mentioned disadvantages and to obtain a greater abundance of results, the invention relates to such a method of ground illumination by means of electromagnetic radiation generated by an aerial simulator, coupled to the ground, and of calculation of the dielectric constant and conductivity thereof, from said radiation, according to which:

the radiation is transmitted in form of an electromagnetic pulse having determined characteristics from an aerial simulator of the horn type, the characteristics of the electromagnetic pulse are sensed at a point in the illuminated area, and, the dielectric constant and the conductivity of the ground are calculated from the detected values.

The invention also relates to an aerial simulator coupled to the ground for carrying out the method, comprising at least two conductive layers, for example; in form of conductive wire layers united, on the one side, to form a horn, ending, on the opposite side, in the ground, where they are extended by a buried structure, and on that side where they are united, in a connector for connection with pulse generating and measurement means.

Other characteristics and advantages of this invention will moreover appear from the following description made with reference to the attached drawings illustrated preferential exemplifying modes and forms of embodiment.

BRIEF DESCRIPTION OF THE DRAWINGS

FIG. 13 shows the whole of the installation for carrying out the method according to the invention.

FIGS. 14A to 14F show curve versus time of the incident, reflected and total fields on the ground, which are electric and magnetic respectively.

FIGS. 16 and 17 show details of two respective diagrams of exploitation of a simulator in accordance with the invention.

FIG. 21 shows curves of the transmitted electric field versus the incident electric field as a function of the depth for different values of conductivity and dielectric constant of the ground.

DETAILED DESCRIPTION OF PREFERRED EMBODIMENTS

Generally, when the ground is illuminated by a planar electromagnetic wave arriving under the incidence angle $\psi$, the incident wave is characterized by its electric field $\vec{E}$ and its magnetic field $\vec{H}$, perpendicular to one another, in phase, and in the ratio: $(E/H) = 120\pi$ ($\Omega$). It is assumed that the ground has a uniform conductivity $\sigma$, a relative dielectric constant $\epsilon_r$, a magnetic permeability $\mu_o$, and an infinite extension in the direction Oy and Oz (at the surface), and Ox (in depth)

Figure 1:
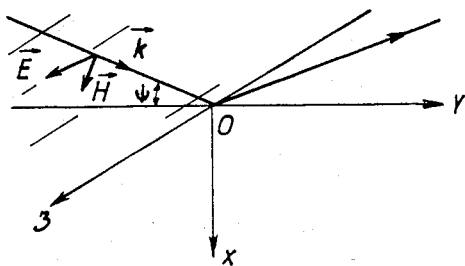
FIGS. 1 and 2 show the decomposition of a wave hitting the ground according to two elementary polarizations, horizontal and vertical, respectively, in a given reference system.
Figure 2:
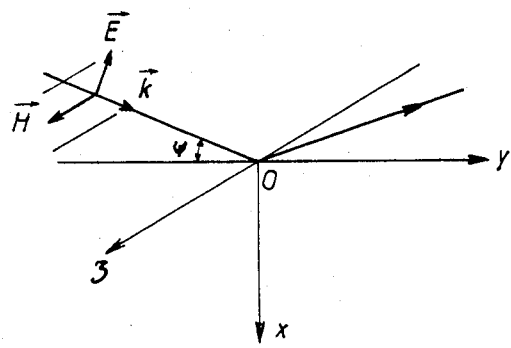

It is always possible to decompose the incident wave according to the two elementary polarizations:

horizontal, electric field parallel to the ground (FIG. 1), vertical, electric field contained in the incidence plane—(FIG. 2).

It is known that impedance difference between ground and air imposes respect of boundary conditions on waves propagating in both media.

Boundary conditions for the tangential components of E and H therefore entails the existence in air of a planar reflected wave the propagation vector $\vec{k}$ of which makes with axis Oy the same angle $\psi$ as the incident wave.

Figure 3:
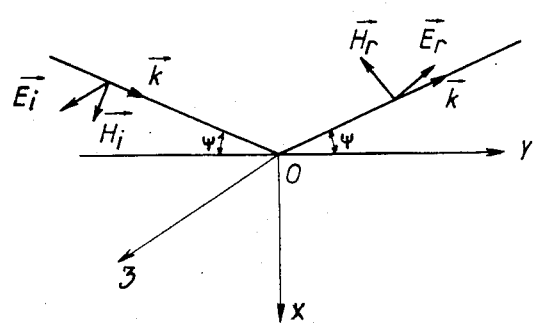
FIGS. 3 and 4 show the decomposition of the incident and reflected fields corresponding to a wave hitting the ground according to FIGS. 1 and 2, respectively.
Figure 4:
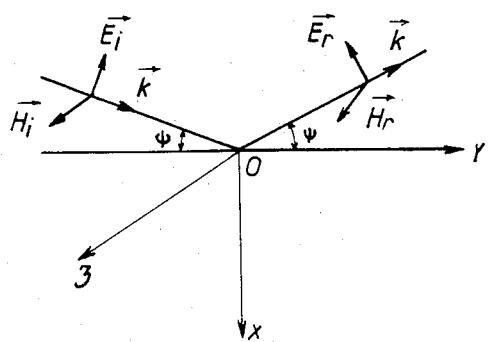

In any point on the surface of the ground the reflected field $E_r$ is also bound to the incident field $E_i$ and to the radian frequency $\omega$ through the relation:

$$E_r e^{j\omega t} = R \cdot E_i e^{j\omega t} \text{ (in amplitude and phase)(FIGS. 3 and 4).}$$

R then has the two following forms $R_h$, $R_v$, respectively corresponding to the horizontal polarization and the vertical polarization:

The sign $-$ must be associated with fields of the form $E\,e^{+j\omega t}$, and the sign $+$ with the fields of the form $E\,e^{-j\omega t}$.

The resulting fields at the ground are the vectorial sum of the incident field and the reflected field.

For a horizontally polarized incident wave we find:
a total tangential electric field $$E_t = E_i(1 + R_h)$$

a total tangential magnetic field $$H_t = H_i(1 - R_h) \sin \psi$$

a total normal magnetic field $$H_n = H_i(1 + R_h) \cos \psi$$

and in vertical polarization (FIG. 4), there will be:
a total normal electric field $$E_n = E_i(1 + R_v) \cos \psi$$

a total tangential electric field $$E_t = E_i(1 - R_v) \sin \psi$$

a total tangential magnetic field $$H_t = H_i(1 + R_v).$$

Figure 5:
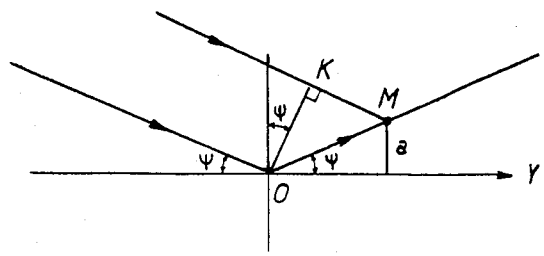
FIG. 5 shows the difference of course at a point between an incident ray and a reflected ray coming from reflection of an incident ray parallel to the first one.
Figure 6:
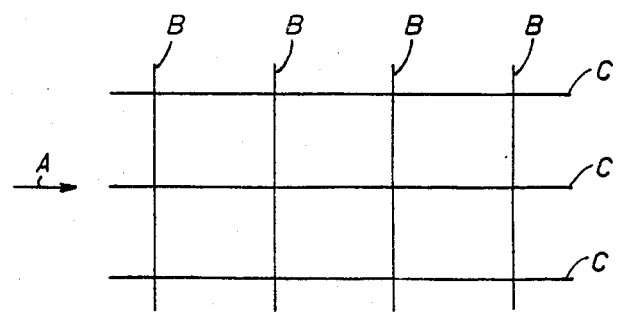
FIGS. 6 and 7 schematically show propagation of planar and spherical waves respectively in the free space.
Figure 7:
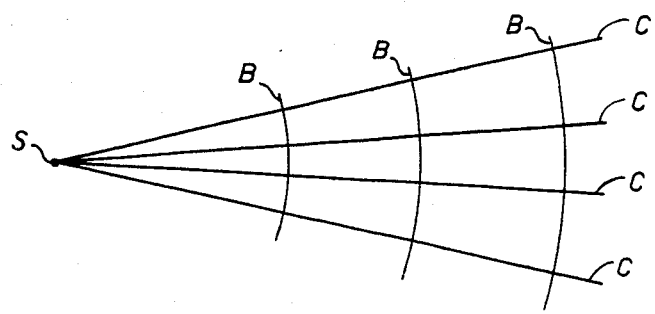
Figure 8:
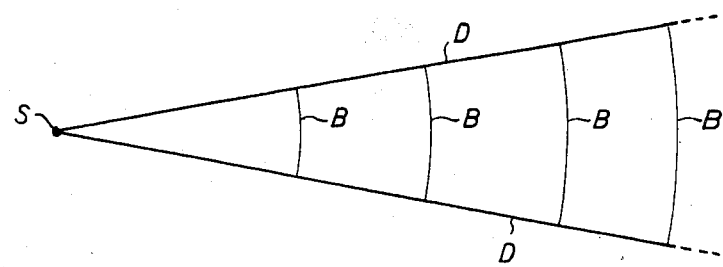
FIGS. 8 and 9 schematize propagation of spherical waves with respectively a simulator having an infinite length and a finite length according to the invention.
Figure 9:
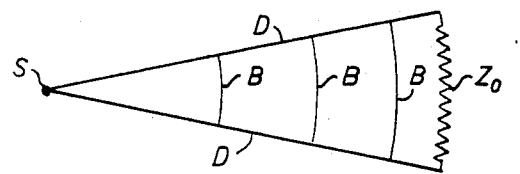

In any point lying above the ground at an altitude a the incident and reflected fields interfere in the same way as before with however a delay resulting from the difference in travel between the direct ray and the reflected ray reaching that point, as shown in FIG. 5 where it can be seen that at point M the difference of $$R_h = \frac{\sin\psi - \sqrt{\epsilon_r\left(1 - j\frac{\sigma}{\omega \cdot \epsilon_o \cdot \epsilon_r}\right) - \cos^2\psi}}{\sin\psi + \sqrt{\epsilon_r\left(1 - j\frac{\sigma}{\omega \cdot \epsilon_o \cdot \epsilon_r}\right) - \cos^2\psi}}$$

$$R_v = \frac{\epsilon_r\left(1 - j\frac{\sigma}{\omega \cdot \epsilon_o \cdot \epsilon_r}\right)\sin\psi - \sqrt{\epsilon_r\left(1 - j\frac{\sigma}{\omega \cdot \epsilon_o \cdot \epsilon_r}\right) - \cos^2\psi}}{\epsilon_r\left(1 - j\frac{\sigma}{\omega \cdot \epsilon_o \cdot \epsilon_r}\right)\sin\psi + \sqrt{\epsilon_r\left(1 - j\frac{\sigma}{\omega \cdot \epsilon_o \cdot \epsilon_r}\right) - \cos^2\psi}}$$

It is to be noted that the quantity $$\epsilon_r\left(1 - j\frac{\sigma}{\omega \cdot \epsilon_o \cdot \epsilon_r}\right)$$

often designated as the "complex dielectric constant" of the ground, is often met with in the literature in the form $$\epsilon_r\left(1 + j\frac{\sigma}{\omega \cdot \epsilon_o \cdot \epsilon_r}\right)$$

course between the direct and reflected rays is equal to $OM - KM$, i.e.:

$$OM = \frac{a}{\sin\psi}$$

$$KM = OM \sin\left(\frac{\pi}{2} - 2\psi\right) = OM \cos 2\psi = \frac{a}{\sin\psi}\cos 2\psi.$$

hence $$OM - KM = \frac{a}{\sin\psi}(1 - \cos 2\psi) = 2\,a\,\sin\psi$$

The delay between both waves is therefore $$\frac{2a \sin\psi}{C}.$$

with C being the propagation speed of the light in vacuum.

Therefore, it will be sufficient to take again the formulae of composition of the fields established above, by assigning the quantity $$\Delta = e^{j\omega \frac{2a \sin\psi}{C}}$$

at radian frequency $\omega$, to coefficients $R_v$ or $R_h$.

The total fields have then the form $$E, H = E_i H_i (1 \pm Re^{j\Delta}).$$

and the delay $\Delta$ will be translated:

for a continuous wave of radian frequency $\omega$, into a supplementary phase shift between incident wave and reflected wave, for a pulse wave E (t) or H (t), into a delay between arrivals of incident wave and reflected wave.

Reflection at the surface of the ground is accompanied by the transmission of a wave into the ground. Such wave propagates into two directions $O_x$ and $O_y$, with differing characteristics, i.e.:

$$\left.\begin{array}{c} E(x, y) \\ \text{or} \\ H(x, y) \end{array}\right\} = \left\{\begin{array}{c} E(x=0, y=0) \\ \text{or} \\ H(x=0, y=0) \end{array}\right\} e^{j(\omega t - k_x x - k_y y)}$$

where the complex number $e^{j(\omega t - k_x x - k_y y)}$ can be defined as a transmission ratio T, the wave vectors $k_x$ and $k_y$ being defined as:

$$k_x = \omega \sqrt{\epsilon_0 \cdot \mu_0} \cdot \sqrt{\epsilon_r \left(1 - j\frac{\sigma}{\omega \cdot \epsilon_0 \cdot \epsilon_r}\right) - \cos^2\psi}$$

$$k_y = \omega \sqrt{\epsilon_0 \cdot \mu_0} \cdot \cos\psi.$$

i.e. $T = e^{j(\omega t - k_x X - k_y Y)}$

Therefore, there is attenuation of the wave in the direction $O_x$. If only the propagation according to $O_x$ is interesting, one can write the following:

$$\left.\begin{array}{c} E(x) \\ H(x) \end{array}\right\} = \left\{\begin{array}{c} E(x=0) \\ H(x=0) \end{array}\right\} e^{j(\omega t - \frac{\omega}{C} x \sqrt{\epsilon_r(1 - j\frac{\sigma}{\omega \epsilon_0 \epsilon_r}) - \cos^2\psi})}$$

The fields E (x=0) and H (x=0) have been obtained above as the algebraic sums of the incident and reflected fields at the separation surface.

It must be noted that fields E and H (both at the surface and in depth) are no longer in phase, nor are they in the ratio $Z_0 = 120\pi$; on the contrary, if the tangential components $E_t/H_t$ both in horizontal and vertical polarizations are interesting, one will obtain:

in horizontal polarization:

$$\frac{E_t}{H_t} = \frac{E_i}{H_i} \cdot \frac{(1+R_h)}{(1-R_h)\sin\psi} = Z_0 \frac{1}{\sqrt{\epsilon_r\left(1 - j\frac{\sigma}{\omega \cdot \epsilon_0 \cdot \epsilon_r}\right)}}$$

and in vertical polarization $$\frac{E_t}{H_t} = \frac{E_i}{H_i} \cdot \frac{(1-R_v)\sin\psi}{(1+R_v)} = Z_0 \frac{1}{\sqrt{\epsilon_r\left(1 - j\frac{\sigma}{\omega \cdot \epsilon_r \cdot \epsilon_0}\right)}}$$

The fields $E_t$ and $H_t$ are therefore in the following ratio:

$$Z = Z_0 \frac{1}{\sqrt{\epsilon_r\left(1 - j\frac{\sigma}{\omega \cdot \epsilon_0 \cdot \epsilon_r}\right)}}$$

representing the impedance of the medium constituted by the ground, and there will be in horizontal polarization:

$$E_t = E_i(1+R_h) \cdot T,$$

$$H_t = H_i(1-R_h) \sin\psi \cdot T,$$

$$H_n = H_i(1+R_h) \cos\psi \cdot T.$$

and in vertical polarization:

$$E_n = E_i(1+R_v) \cos\psi \cdot T,$$

$$E_t = E_i(1-R_v) \sin\psi \cdot T,$$

$$H_t = H_i(1+R_v) \cdot T.$$

The form of the expressions $R_v$ and $R_h$ shows that two asymptotic cases can be envisaged for:

$$\omega >> \frac{\sigma}{E_0 \cdot E_r} \text{ (high frequencies) } \frac{\sigma}{\omega \cdot E_0 \cdot E_r} \to 0.$$

and $R_v$ and $R_h$ depend only upon $\psi$ and $\epsilon_r$; the ground behaves like a dielectric;

in particular, if $$\psi = \frac{\pi}{2}, R_v = R_h = \frac{1 - \sqrt{\epsilon_r}}{1 + \sqrt{\epsilon_r}};$$

for $$\omega << \frac{\sigma}{E_0 \cdot E_r} \text{ (low frequencies), } \frac{\sigma}{\omega \cdot E_0 \cdot E_r} \to \infty.$$

and $R_h \to -1$;

the ground behaves as perfectly metallic medium.

Typical curves such as $R_v = f(\omega)$ and $R_h = f(\omega)$ can be plotted with different values of the incident angle, such that $R_v = f(\psi)$ and $R_h = f(\psi)$, for different values of the frequency of the radian frequency, and this for given values of the dielectric constant $\epsilon_r$ and conductivity $\sigma$.

It is also possible to plot typical curves such as that of the ratio of the incident field to the total field at the measurement point in case of reflection measurements or that of the ratio of transmitted field to incident field as a function of the depth in case of measurement by transmission, for different values of $\epsilon_r, \sigma, \psi, \omega$, etc.

Finally, it is possible to calculate for a-priori given $\epsilon_r$, $\psi$ and $\omega$ values, typical curves showing the form versus time of the electric or magnetic fields above the ground or therein, for a given form of incident field.

Such typical curves being calculated, it is possible to use them with a view to identifying a detected wave and calculating the dielectric constant and the conductivity.

It is to be noted that the reflective phenomena are fundamentally different according to whether the wave is of horizontal or vertical polarization.

Practically, the problem can be exposed by considering that it is desired for simulating a planar wave to realize electromagnetic illumination of any ground by means of a "guided wave" simulator so as to determine:

the characteristics of the local wave in the neighbourhood of the ground (in air or in the ground), the characteristics of the ground ($\epsilon_r, \sigma$) deducted from local phenomena.

It is possible to use a simulator in accordance with the invention on which such phenomena are easily interpretable.

Such a simulator with guided waves can be represented by thinking of two metallized equipotential surfaces accompanying a planar or spherical wave radiated into the free space.

The limiting conditions being respected, the physical phenomena remain what they were.

To limit the longitudinal dimension of such a simulator, both metallized layers are closed by a matching impedance at a finite distance from the source so that no reflection comes to interfere with the incident wave, thereby leading to the various cases shown in FIGS. 6 to 9.

Thus, in the ideal case of a planar wave propagating in free space (FIG. 6), the direction of propagation being shown by the arrow A, in cross-section, the fronts of wave B are straight lines perpendicular to the direction A and the equipotential lines C are straight lines cutting them normally.

In the ideal case of the spherical wave propagating in free space (FIG. 7), from a source S, in cross-section, the fronts of wave B are circumferences centered on source S and the equipotential lines are straight half-lines C cutting them normally.

In the derived case with a simulator having a spherical guided wave of infinite length in which the propagation zone is limited by metallized layers D represented in cross-section by straight half-lines (FIG. 8), the fronts of wave B are represented by circumferential arcs centered at the source S.

In an another derived case, with a simulator having guided spherical wave of finite length in which the propagation zone is limited by metallized layers D of finite length connected at the opposite from the source by a load impedance Z, for example, the characteristic impedance $Z_0$ (FIG. 9), the fronts of wave B are also shown by circumferential arcs centered at source S.

Let us assume that a planar or spherical wave hits the ground (under normal incidence to simplify the problem).

The wave which was propagating in air with the vacuum impedance ($Z_0 = 120\pi$ $\Omega$) meets a medium having a smaller impedance Z such that:

$$Z = \frac{Z_0}{\sqrt{\epsilon_r \left(1 - j\frac{\sigma}{\omega \cdot \epsilon_0 \cdot \epsilon_r}\right)}}$$

Referring to the preceding paragraph, it appears that one can simulate the incident wave by means of a simulator having a guided wave of infinite length.

The complex medium constituted by the ground will fill the interelectrode space from an abscissa plane $x = h$, without limits.

Figure 10:
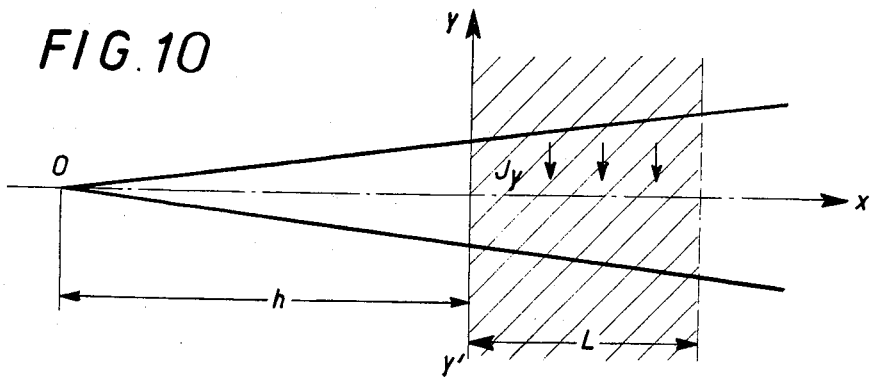
FIG. 10 schematizes a simulator according to the invention in contact with the ground where a wave is guided even within the latter.

In fact, things are quite different, and the length of the layers penetrating the ground is obligatorily finite. There results a difference between simulation and reality which must be assessed. To this end, let us consider two asymptotic cases, reasoning on the base of the sectional representation of FIG. 10. In this figure, the source is disposed at a point O remote from the ground by a distance h, and the metallized layers D penetrate the ground to a depth L; the reference axes are Ox (bissectrix of the angle delimited by the metallized layers) and y'y (ground line), and the currents generated in the ground are denoted $J_y$.

In high frequencies, the currents $J_y$ induced into the ground by the electric or magnetic fields in the surface weaken exponentially in the direction Ox. As long as depth L of the layers within the ground is much higher than the depth of penetration of those currents, the currents $J_y$ (for $x = h + L$), at the end of the conductive layers are very small; interruption of said layers at the abscissa $x = L + h$, has therefore no noticeable influence.

It must be noted that the depth of penetration depends on the frequency $$\left(\delta = \frac{1}{\sqrt{\pi \cdot \mu_0 \cdot f \cdot \sigma}}\right)$$

and that if excitation is impulsional the phenomena will be correctly rendered for the portion of the spectrum such that $\delta << L$.

The penetration depth increases when the frequency decreases. The impedance included between the two layers diminishes accordingly. If the layers are stopped to a depth L the phenomena will be distorted when $\delta \approx L$. In other words, when the frequency tends towards 0 the ground impedance as seen between the layers should normally tend towards 0; with truncated layers, it will tend towards the quantity:

$$R = \frac{1}{\sigma} \cdot \frac{1}{L \cdot W}$$

with
l = distance between layers;
W = width of the layers;
L = depth of the layers.

Figure 11:
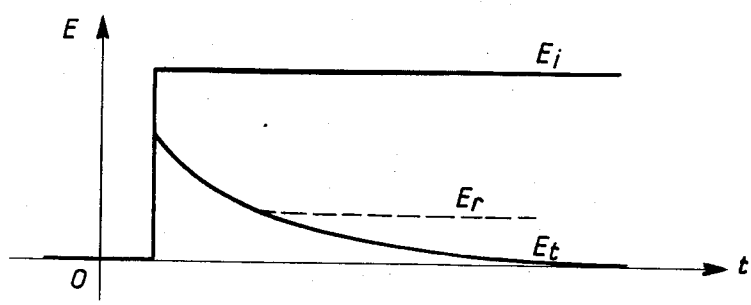
FIG. 11 shows a development of the field versus time in a simulator with guided waves and layers of finite length.

Therefore one can foresee that with a guided wave simulator having layers of finite length, the long term effects will not be correctly rendered, and that, in particular, the tangential field in the neighbourhood of the ground will be higher than presupposed by theory. This fact is illustrated in FIG. 11 showing development of the field as function of time, wherein in reply to a level of incident field $E_i$ and after rapid growth, the total field obtained $E_r$ decreases well but without reaching the little value of the theoretical field $E_t$. Only the elongation of the buried portion of the metallic layers could improve such a point as shown in an exemplifying way in FIG. 11.

It is to be noted that due to the fact that a pulse is used, rather than a wave train of a single frequency, there is obtained a large spectrum width extending as low as desired toward the low frequencies and which may reach several tens of megahertz depending on the characteristics of the chosen pulse. Consequently, there is a great abundance of results, possibilities of investigation in a great number of directions and the faculty of making very interesting crosschecking of the results, contrary to the known cases where the tests of a connected type give very limited results and therefore require a great number of measurements at different frequencies by means of distinct equipments to be adapted to the respective frequency of the sinusoidal wave used for the investigations.

Figure 12:
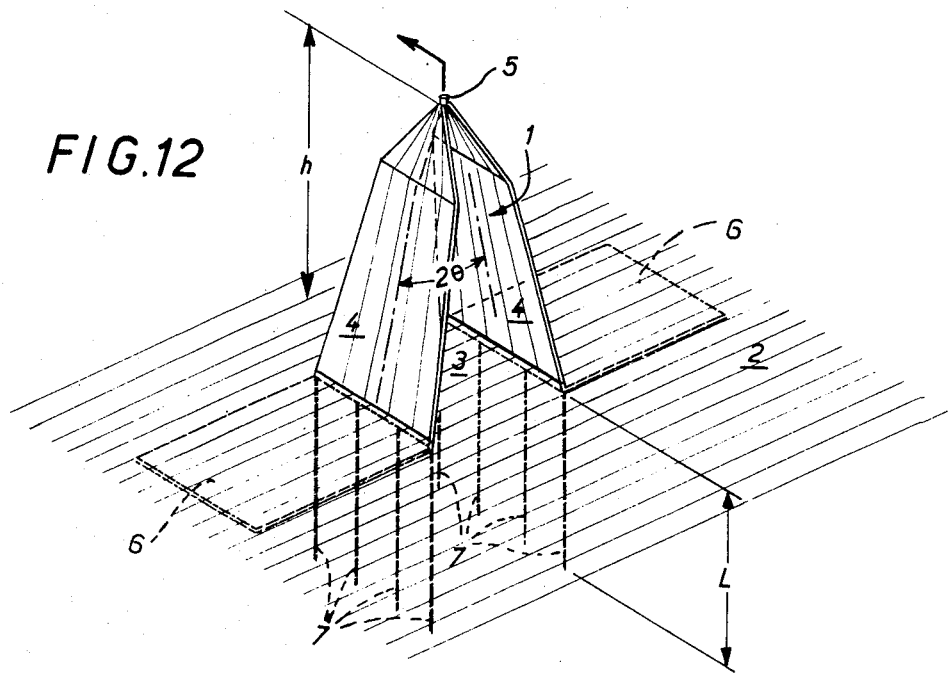
FIG. 12 shows a simulator according to the invention.

The aerial simulator 1, in accordance with the invention, which is shown schematically in FIG. 12 is disposed vertically on the surface of the ground 2. It comprises a propagation zone 3 limited by two metallic or metallized layers 4, for example two layers of conductive wires delimiting a dihedron of angle $2\theta$; these two layers 4 form a horn and are connected to the apex of the dihedron by an input connector 5 joined to a suitable generator of electromagnetic wave (not shown), with impedances being matched. The coupling to the ground is ensured at the opposite of the apex of the dihedron by a buried structure, for example, two horizontal conductive metallic wire netted layers 6 (or lattice works) buried in the ground, here at a little depth, through layers or stakes 7 of length L buried vertically into the ground, with predetermined spacings or penetration depths or else with a combination of both configurations as in FIG. 12; thus, the layers (here two in number) define on the ground a polygon (here, a square) outside of which the wire netting layers buried in the ground can extend.

Excitation of the horn simulator 1 described above can be effected through a generator of suitable pulses having an impedance of 50Ω connected to the simulator by a cable having an impedance of about 50Ω. To prevent unwanted reflections a resistive bidirectional adaptation 50Ω/120Ω is realized at the input connector to the simulator.

FIG. 13 shows a schematic diagram wherein the field reflected from the ground is absorbed by a horn impedance adaptor and does not distort the observed signal.

The simulator 1 having an impedance $Z_c$ here equal to 120Ω, is provided at its summit (at its input connector 5) with an adapter 50Ω/120Ω denoted 8, connected through a line to the generator 9 joined through a line to a control device not shown; the adapter 8 is also connected to measurement devices in particular to an oscilloscope 10 for checking the signal, for example by displaying a level applied thereto, on the one hand, and on the other hand, to a measurement oscilloscope 11 to synchronize the signal. On the ground 2 in the illumination area there is disposed a support 12 for a field sensor 13 for measurement of a value representing the magnetic or electric field reflected from the ground. The sensor 13 has preferably an opto-electronic interface which is connected through an optic fiber cable 14 to a receiver 15 used as an opto-electronic transducer having an output applied through an electric cable to the input to the oscilloscope 11 synchronized by the input signal.

The reflected field from the ground is absorbed by the impedance adapter so that no parasite reflection may distort the observed signal.

The sensor 13 is mounted here at the bottom of the simulator, level with the ground, and the local field tangential to the ground level is simply observed; the sensor can also be at the top of the simulator and the transmission aerial is then used also for reception; one can then observe the pulse of incident field reflected from the ground and returned to the sensor after a delay of several nanoseconds.

The sensor used is of the asymmetric type such as a capacitive electric field probe or a magnetic field loop. Its reference electrode is secured to the wall of the simulator in electric continuity therewith.

The generated field pulse is of rectangular shape having a rising time in the order of a few nanoseconds. Its width is set to a few microseconds, which in view of the speed of observation on the oscilloscope (10×50 or 10×100 ns), can relate it to a step of infinite duration.

Therefore, we are dealing with a "pulse" in the electronic sense, and not with a sinusoidal wave train, for example, in U.H.F. the envelope of which would have the characteristics just mentioned above.

After field measurements the characteristics $\epsilon_r$ and $\sigma$ of the ground can be calculated according to the following procedure:

The shape of the fields in the neighbourhood of the ground is observed in respect to the incident field and/or the voltage versus current in the simulator. The theoretical study exposed above shows that if the ground is homogeneous, there will be:

a peak value of the total field having a ratio:

$$\frac{E_{tangential}}{E_{incident}} = \frac{2}{\sqrt{\epsilon_r + 1}}$$

with the incident field.

a long-term decrease characterizing conductivity, a limit to such decrease having a constant value depending on the ground contacting efficiency of the simulator electrodes in the ground.

If $Z_c$ is the simulator impedance, the residual level of the long-term tangential electric field ought to be in the order of:

$$\frac{E_{residual}}{E_i} = \frac{2R}{Z_c + R}$$

The simulator horn essentially consisting of conductors united, after grouping thereof, to an input connector 5 connected to an adapter 8 and to a generator 9, on the one hand, and on the other hand, to buried electrodes 6, 7, can be of the vertical or slanted type with an angle $\psi$.

Moreover, the angle of the dihedron $2\theta$ conditions adaptation of the horn as will be demonstrated hereinafter.

If the angle $2\theta$ of the dihedron of the line is small and if the stakes 7 are e.g. sufficiently long, the propagation conditions of an E.M.I. wave in the line, in the direction of the ground, are rigorously identical to those met with by a free space wave hitting the ground under normal incidence: the effect of the incident wave is only limited to the cross-section in the established line.

If $\psi$ is the incidence angle, $\epsilon_r$ and $\sigma$ the ground dielectric and conductive characteristics, it can be demonstrated without difficulty that the reflective coefficient of an infinite homogeneous medium separated from air by a plane is:

in horizontal polarization:

$$R_h = \frac{\sin\psi - \sqrt{\epsilon_r\left(1 - j\frac{\sigma}{\omega \cdot \epsilon_0 \cdot \epsilon_r}\right) - \cos^2\psi}}{\sin\psi + \sqrt{\epsilon_r\left(1 - j\frac{\sigma}{\omega \cdot \epsilon_0 \cdot \epsilon_r}\right) - \cos^2\psi}}$$

and in vertical polarization:

$$R_v = \frac{\epsilon_r\left(1 - j\frac{\sigma}{\omega \cdot \epsilon_0 \cdot \epsilon_r}\right)\sin\omega - \sqrt{\epsilon_r\left(1 - j\frac{\sigma}{\omega \cdot \epsilon_0 \cdot \epsilon_r}\right) - \cos^2\psi}}{\epsilon_r\left(1 - j\frac{\sigma}{\omega \cdot \epsilon_0 \cdot \epsilon_r}\right)\sin\psi + \sqrt{\epsilon_r\left(1 - j\frac{\sigma}{\omega \cdot \epsilon_0 \cdot \epsilon_r}\right) - \cos^2\psi}}$$

In normal incidence:

$$\psi = 90°$$

$$R_v = R_h = R$$

$$R = \frac{1 - \sqrt{\epsilon_r\left(1 - j\frac{\sigma}{\omega \cdot \epsilon_0 \cdot \epsilon_r}\right)}}{1 + \sqrt{\epsilon_r\left(1 - j\frac{\sigma}{\omega \cdot \epsilon_0 \cdot \epsilon_r}\right)}}$$

It appears immediately that R presents two simple limiting cases:

in high frequencies:

$$\left(\omega > \frac{\sigma}{\epsilon_0 \cdot \epsilon_r}\right) \quad R = \frac{1 - \sqrt{\epsilon_r}}{1 + \sqrt{\epsilon_r}}.$$

and the reflection only depends on the ground dielectric constant:

in low frequencies:

$$\left(\omega < \frac{\sigma}{\epsilon_0 \cdot \epsilon_r}\right) \quad R = 1.$$

and the ground totally reflects the incident field.

If the incident field consists of a level of electric and magnetic planar wave, the properties of the reflective coefficient are translated in the way shown in FIGS. 14A to 14F.

Thus, the electric incident field $E_i$ of the level +1, in FIG. 14A, and the reflected electric field $E_r$ ending to the level −1, after passing an angular point $E_a$ of the level $$\frac{1 - \sqrt{\epsilon_r}}{1 + \sqrt{\epsilon_r}}$$

in FIG. 14B, add themselves to give the total electric field on the ground $E_t$ having a maximum $E_m$ at the level $$\frac{2}{1 + \sqrt{\epsilon_r}}$$

of FIG. 14C.

Similarly, the incident magnetic field $H_i$ of the level 30 1 in FIG. 14D and the reflected magnetic field $H_r$ ending to the level +1 after passing an angular point $H_a$ of the level $$\frac{\sqrt{\epsilon_r} - 1}{\sqrt{\epsilon_r} + 1}$$

in FIG. 14E, add themselves to give the total magnetic field on the ground $H_t$ ending to the level +2 of FIG. 14F.

Finally, a portion of the incident field penetrates the ground where it is progressively attenuated due to dissipation of energy in the resisitive portion of the ground impedance.

The attenuation is therefore selective as a function of the frequency, and the signal in depth is progressively integrated, with the high frequencies being attenuated more quickly than the low frequencies.

Figure 15A:
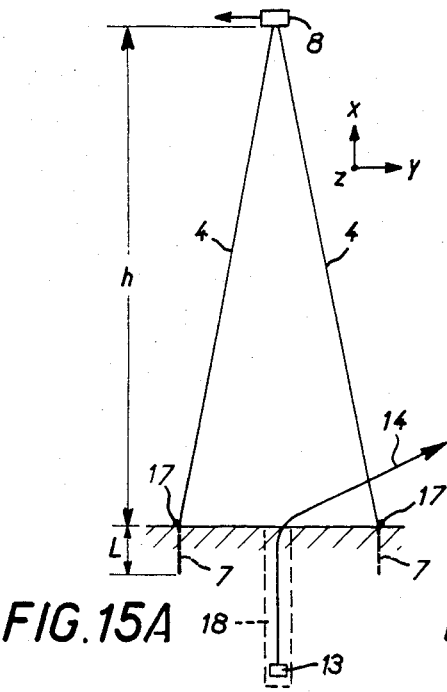
FIGS. 15A and 15B are side views in perpendicular directions of a form of embodiment with vertical axis of a simulator in accordance with the invention.
Figure 15B:
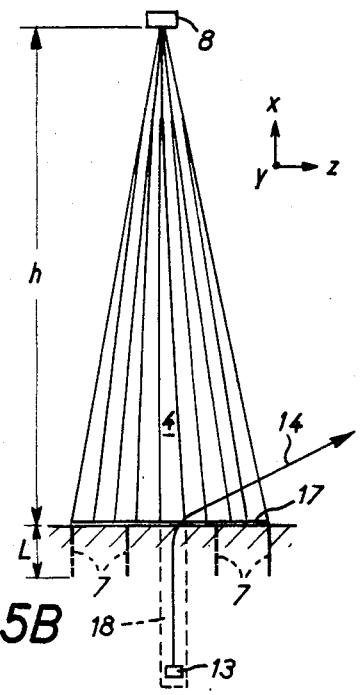

According to a form of embodiment of the invention shown in FIGS. 15A and 15B, the horn simulator comprises:

two layers 4 of conductive wires connected to the adapter 8 and to the electrodes in form of stakes 7 in the figure, a ground area cleared under the simulator, of height $h \approx 10$ m, two rows of metallic vertical stakes 7 of length $L \approx 4$ m, buried in the ground according to a wire netting which will be called "test zone".

These stakes can advantageously be united to a horizontal conductive strapwork 17 to which the conductor layers constituting the tested aerial are connected.

Such simulator has a vertical axis and the connecting element in which the layers end is therefore substantially plumb with the center of the basic square.

In the center of the test and illumination zone, a well or cavity 18 permits depth measurements in the ground by means of the sensor 13.

Figure 17:
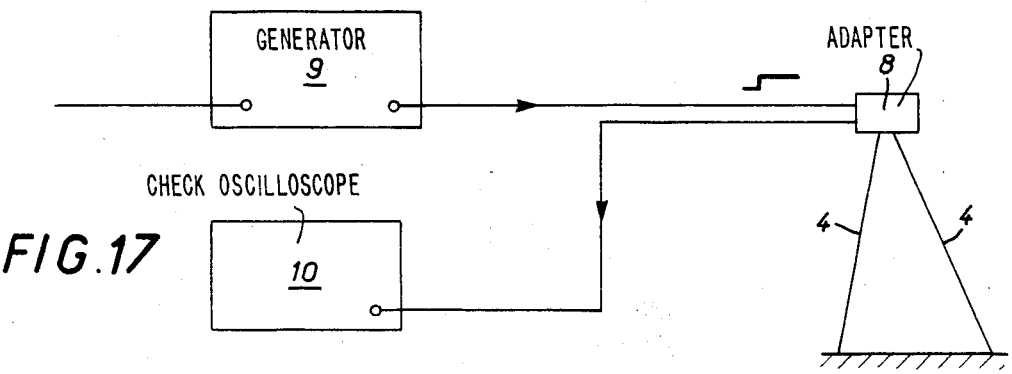

The measuring circuitries can have alternative forms of embodiment and although the general schematic diagram is that of FIG. 13, the practical realizations shown in FIGS. 16 and 17 can be used.

Measurements are effected by means of assemblies E or H comprising, apart from the optic sensor 13, an opto-electronic transducer connected to the sensor through an optical fiber cable 14 and the results are recorded on an oscilloscope 11 (not shown in FIGS. 16 and 17). The generator used is a suitable one 9 that can be provided with a relay having a mercury switch with elastic blades, and mounted at the output of a coaxial line of 50Ω to permit supply of pulses having a voltage equal to or lower than 500 V on 50Ω, with a rising time of the assembly comprising wirings, generator, sensors E or H, optical connection, oscilloscope, of 4 ns.

Reflectometry measurements are effected on the lines in two different ways depending on whether they are made by means of the circuitry of FIG. 16 or that of FIG. 17:

with respect to 50Ω, by measuring the output voltage from generator 9 with a probe 19 of impedance 1MΩ, applied to the oscilloscope 10 through a connection cable;

with respect to the characteristic impedance of the realized simulator, itself determined in a first step with respect to 50Ω.

There is then inserted at the level of the input connector to the simulator a bidirectional impedance adapter 8 so that the generator sees 50Ω and that the simulator (of characteristic impedance $Z_c$) sees $Z_c$. Such adapter 8 comprises an adaptive divider 1/10 permitting observation on the oscilloscope 10 of the corresponding fraction of the voltage at the input to the simulator, by means of a connection cable.

Figure 18A:
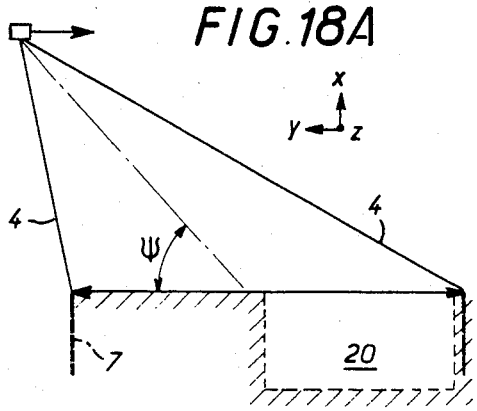
FIGS. 18A and 18B are side views in perpendicular directions of a form of embodiment of a simulator with inclined axis according to the invention.
Figure 18B:
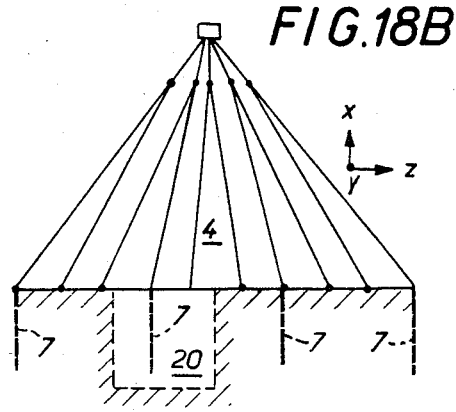

According to another form of embodiment of the invention shown in FIGS. 18A and 18B, where the same reference numerals denote the same elements as in the preceding drawings, the horn simulator excites under an average incidence angle ψ of 45° (axial inclination with respect to the center of the square) the test zone in which a ditch 20 was hollowed out to plant a metallic model simulating a buried building was planted.

Figure 19A:
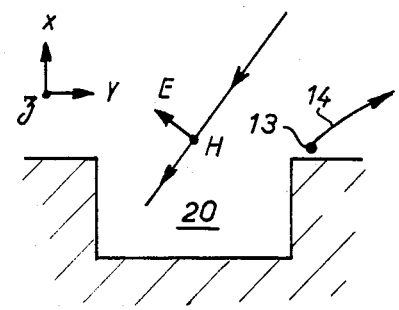
FIGS. 19A to 19D show four conditions for testing a simulator according to the invention.

Under those conditions, the plotting of the field at the ground may show the presence of the horizontal component of the electric field $E_y$ and of the component of magnetic field $H_z$ according to FIG. 19A; only the component $H_z$ is shown in FIGS. 20A to 20D.

Figure 20A:
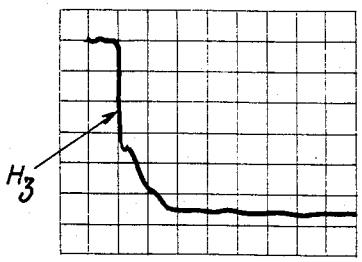
FIGS. 20A to 20D show the oscillograms obtained for a component of the magnetic field in the four test conditions shown in FIGS. 19A to 19D, respectively.
Figure 20B:
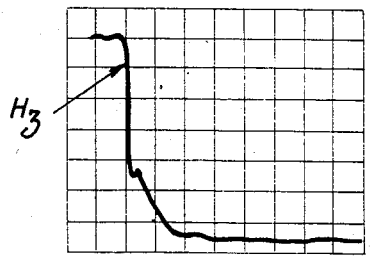
Figure 20C:
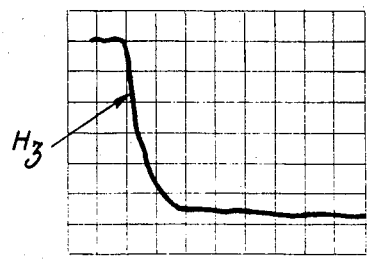
Figure 20D:
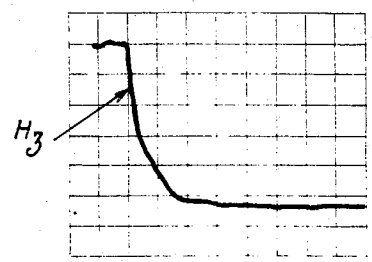

As one gets nearer to the more inclined layer a progressive decrease in the amplitude of the tangential electric field in a ratio close to 2 can be observed. FIG. 20A shows the component $H_z$ at the level of ground and FIGS. 20B to 20D the measurement results obtained from a parallelepipedic model 21 of metal.

Such model is only used for simulating a hypothetical conductive buried structure but does not represent an actual case.

Figure 19B:
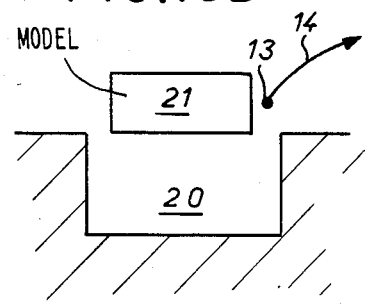
Figure 19C:
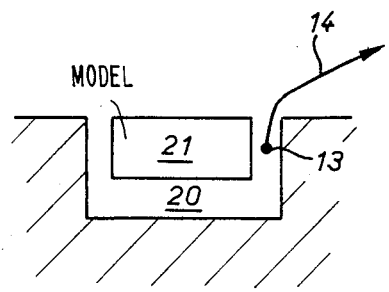
Figure 19D:
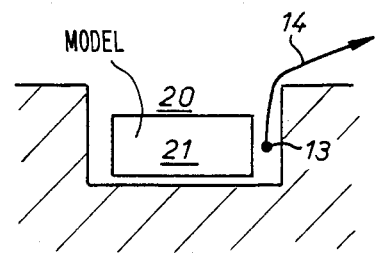

The model is tested in the horn simulator in three positions:

disposed on the ground out of the ditch, with the longitudinal axis being aligned with the direction Oy (direction perpendicular to the layers of the simulator), according to FIG. 19B, in the ditch, according to FIG. 19C, in the ditch, the bottom lying on the ground according to FIG. 19D.

There has been measured by means of a sensor 13 and the optical fiber cable 14:

the magnetic field $H_z$ on the ground, at the edge of the ditch (FIG. 20A), the magnetic field $H_z$ on the front wall of the model (FIGS. 20B to 20D), for an applied voltage of 150 V (calibration: 300 mV D.C.).

It is observed that the model is excited by the magnetic field according to mode 1 (surface current rotating about the direction Oz). The field $H_z$ on the forward face substantially copies back the excitation field.

In conclusion, from the tests made on both forms of embodiment described above and from the enunciated theoretical considerations, it becomes possible to approach with acceptable precision the physic phenomena on the surface and at a little depth by means of simulator structures propagating a wave proximate to the planar wave with a steep rising front.

The reflective conditions of such wave from the ground are respected and thus electromagnetic fields are locally generated, said fields no longer being bound by the relations of the planar wave but respecting the reality of physics, in all the spectrum of useful frequencies (moreover, there can be obtained by a single pulse investigations at all the frequencies in the spectrum thereof).

These fields propagate in depth into the ground and become attenuated, the currents tending toward uniform distribution in the long run.

To the mind, the simulator as conceived is very satisfactory. Indicatively, FIG. 21 shows the amplitude of the electric field (therefore, the current density) transmitted into the ground, versus that of the incident field for different values of conductivity σ and of the dielectric constant $\epsilon_r$, more particularly for $\sigma = 10^{-3}$; $3.10^{-3}$; $10^{-2}$; $3.10^{-2}$; when $\epsilon_r = 5$ and when $\epsilon_r = 10$.

It can be noted that for low conductivity values the decrease is slow ($E/E_i = 0.18$ for $X = 15$ m if $\sigma = 10^{-3}$ mho/m, corresponding to point M on the graph). The curves of FIG. 21 have been plotted for an incidence angle ψ equal to 90°.

It will be understood that the invention is not limited to the modes and forms of embodiment as described and represented above, and that other modes and forms of embodiment can be devised without departing from the scope of the invention.

We claim:

1. An aerial simulator adapted for determination of the dielectric constant and conductivity of the ground, soil, or earth comprising a generator means for generating electric impulses, input connector means connected to receive electric impulses from said generator means, a plurality of at least two conductive layers connected between said input connector means and the ground, extending outward from said input connector means in the shape of a horn open toward the ground for emitting towards the surface of the ground, at a selected incidence angle, electromagnetic pulses derived from said electric impulses received through said input connector means, a buried structure including conductive means connected to said conductive layers and extending under the ground for guiding said electromagnetic pulses down underground to a predetermined depth in the ground so as to radiate said pulses through an excited zone in the ground and adjacent air space, electromagnetic field sensor means located within a space defined by said conductive layers and said buried structure for delivering a signal representative of a local resulting electromagnetic field at a predetermined point in said excited zone, and first and second measuring means connected to receive electronic signals from said input connector means and said sensor means respectively for measuring electric and magnetic fields to determine the dielectric constant and conductivity of the ground.

2. The aerial simulator of claim 1 wherein
said plurality of conductive layers contains two conductive layers formed by conductive wires which define a dihedron determining a rectangle where said horn shape meets the surface of the ground.

3. The aerial simulator of claim 1, wherein
said conductive layers determine a quadrilateral where said horn shape meets the surface of the ground, and said input connector means is substantially located in the air plumb with the center of said quadrilateral.

4. The aerial simulator of claim 1, wherein
said conductive layers determine a quadrilateral where said horn shape meets the surface of the ground, and said input connector means defines with the center of said quadrilateral an emission direction which is inclined with respect to the surface of the ground.

5. The aerial simulator of claim 1 wherein
said conductive layers determine a polygon where said horn shape meets the surface of the ground, and said conductive means of said buried structure includes a conductive metallic wire netting extending outside said polygon at a small depth underground.

6. The aerial simulator of claim 1 or 5 wherein
said conductive means of said buried structure includes conductive stakes at predetermined spacings and penetration depths.

7. The aerial simulator of claim 1 wherein said electromagnetic field sensor means is disposed at the surface of the ground between said conductive layers.

8. The aerial simulator of claim 1 wherein
said electromagnetic field sensor means is disposed in an underground cavity provided in said space defined by said conductive layers and said buried structure.

9. The aerial simulator of claim 1, wherein
said electromagnetic field sensor means is disposed above the surface of the ground between said conductive layers.

10. The aerial simulator of claim 1, wherein said electromagnetic field sensor means is an electric field sensor means.

11. The aerial simulator of claim 1, wherein
said electromagnetic field sensor means is a magnetic field sensor means.

12. The aerial simulator of claim 1, wherein
said second measuring means is connected to a cable made of optical fibers through an opto-electronic receiver, said cable being connected to said sensor means through an opto-electronic interface.

13. The aerial simulator of claim 1, further comprising
a first storing means connected to said first measuring means for storing a predetermined signal representative of said electronic signal as received and measured by said first measuring means, and a second storing means connected to said second measuring means for storing evolution with time of said electronic signal measured thereby, said second storing means being connected to said first measuring means so as to be synchronized thereby.

14. The aerial simulator of claim 1 or 13, wherein
said first measuring means senses voltage of said electric impulses supplied to said input connector means.

15. The aerial simulator of claim 13, wherein
said dielectric constant and conductivity of the ground are determined through comparing respective signals stored by said first and second storing means, while taking into account the position of said predetermined point in said excited zone with respect to the surface of the ground.

16. The aerial simulator of claim 15, wherein
the dielectric constant of the ground is deduced from a ratio of a maximum signal as stored by said second storing means to said signal stored by said first storing means, and conductivity of the ground is determined by comparing said evolution with time of said signal measured by said second measuring means with predetermined calibration curves.

* * * * *